United States Patent [19]

Kimoto

[11] Patent Number: 4,509,154
[45] Date of Patent: Apr. 2, 1985

[54] OPTICAL DISK APPARATUS

[75] Inventor: Katsumi Kimoto, Yokohama, Japan

[73] Assignee: Tokyo Shibaura Denki Kabushiki Kaisha, Kawasaki, Japan

[21] Appl. No.: 474,980

[22] Filed: Mar. 14, 1983

[30] Foreign Application Priority Data

Mar. 15, 1982 [JP] Japan ................... 57-40607

[51] Int. Cl.³ .............................. G11B 17/06
[52] U.S. Cl. ......................... 369/33; 369/41
[58] Field of Search ................... 369/33, 41

[56] References Cited

U.S. PATENT DOCUMENTS

| | | | |
|---|---|---|---|
| 4,145,724 | 3/1979 | Medding et al. | 360/92 |
| 4,301,526 | 11/1981 | Morii et al. | 369/33 |
| 4,321,635 | 3/1982 | Tsuyuguchi | 360/74.4 |
| 4,323,997 | 4/1982 | Kuribayashi et al. | 369/41 |
| 4,361,880 | 11/1982 | Kitamura et al. | 369/41 |
| 4,437,181 | 3/1984 | Kishma | 369/41 |

FOREIGN PATENT DOCUMENTS 57-36482  2/1982  Japan .

Primary Examiner—Steven L. Stephan
Attorney, Agent, or Firm—Cushman, Darby & Cushman

[57] ABSTRACT

An optical disk apparatus is provided in which a track pitch is computed in accordance with a track number currently corresponding to a recording/reproduction head and with a scale value detected by a position detection section when the difference between a scale value obtained by a scale translator and the scale value detected by the position detection section exceeds a predetermined number of tracks, thereby correcting a track pitch used in the scale translator using the computed track pitch.

2 Claims, 4 Drawing Figures

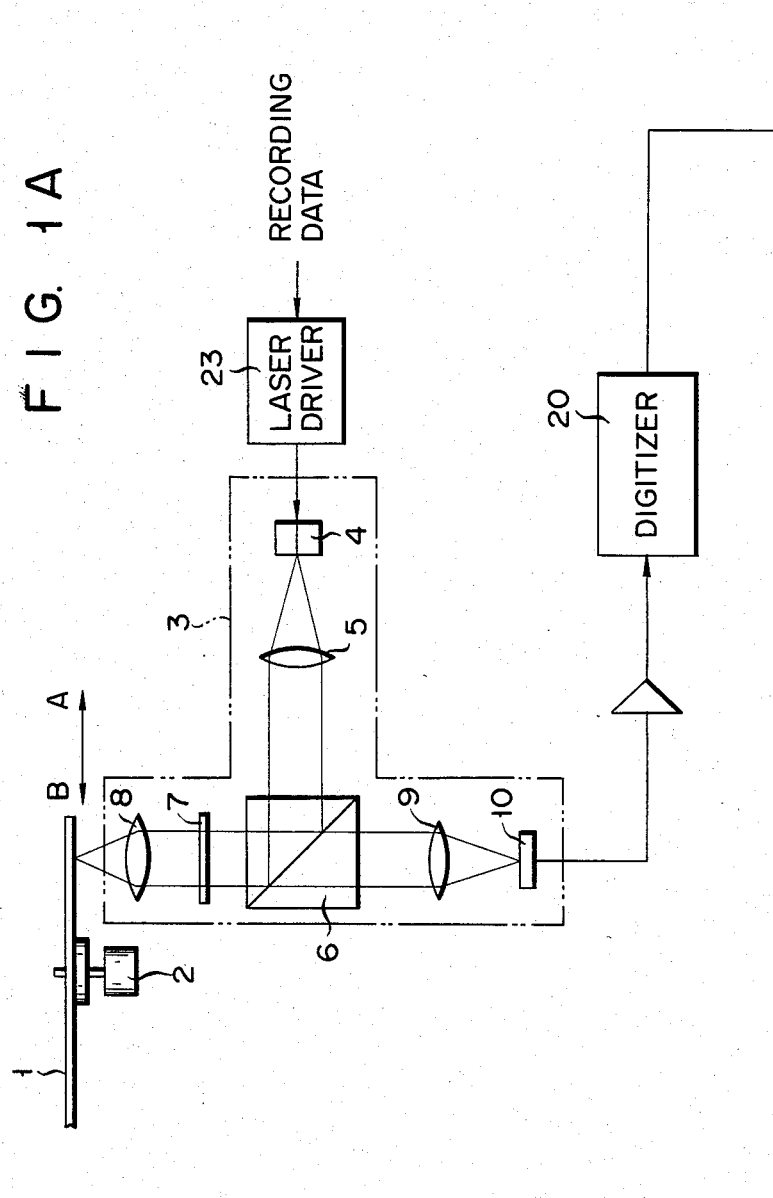

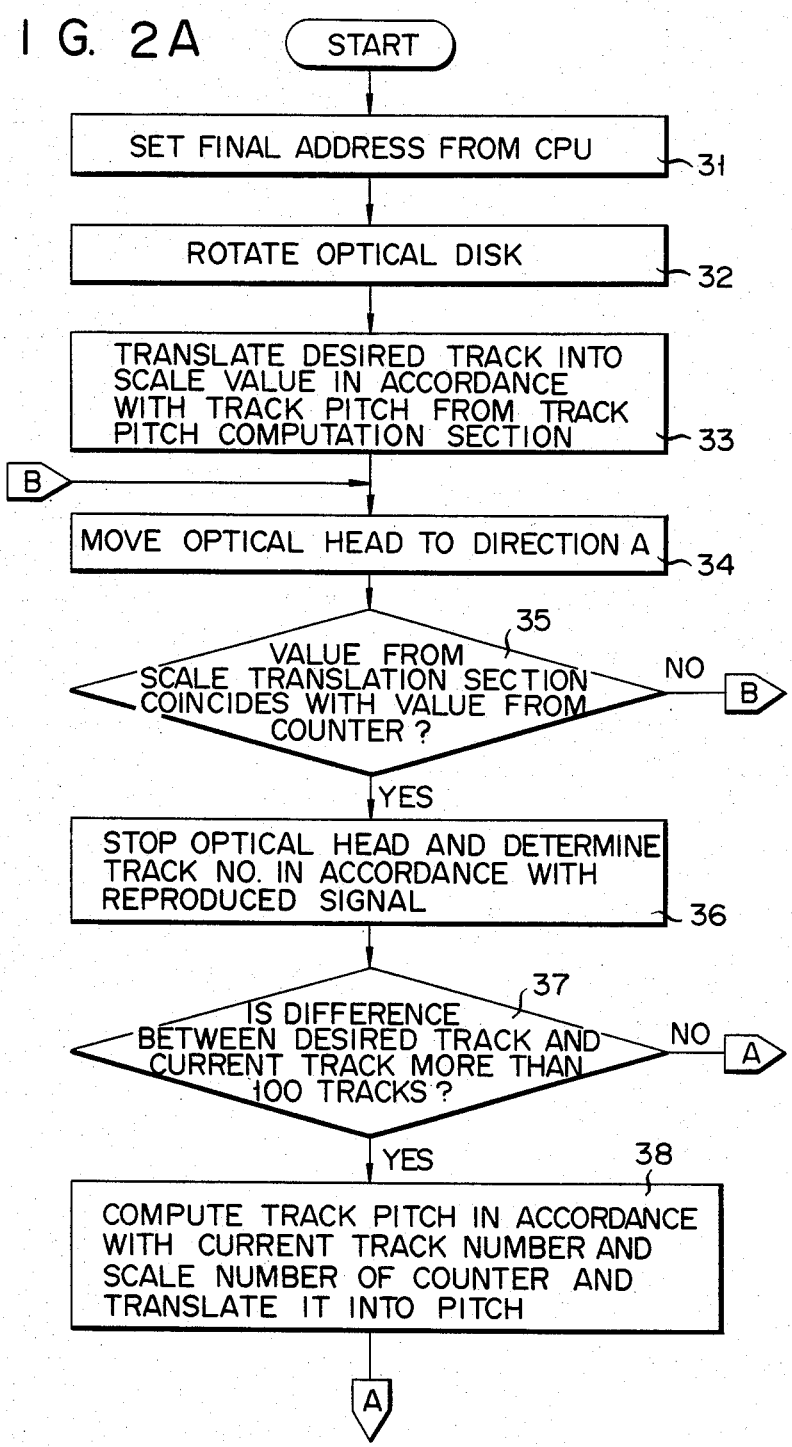

OPTICAL DISK APPARATUS

BACKGROUND OF THE INVENTION

The present invention relates to a data recording apparatus such as an optical disk apparatus for recording/reproducing image data.

An optical disk apparatus optically records data on or reproduces it from an optical disk by scanning the rotating optical disk with a laser beam. The optical disk has received much attention as a hitherto unknown large-capacity memory. For example, the optical disk can be applied to a large-capacity image file apparatus.

Among the optical disk apparatuses of this type, an apparatus is being developed such that recording tracks are formed by grooves called pregrooves (or prepit array) in a spiral (or concentrical) manner, and that a recording beam is radiated on the optical disk so as to form a data pit in the pregroove while a reproducing beam traces the pregroove, thereby recording image data. In this case, the single laser beam is switched between the reproducing beam and the recording beam having higher energy than the reproduction beam.

In the optical disk apparatus of the type described above, an optical head driven by a linear motor in the radial direction of the optical disk is used to record the data on or reproduce it from the optical disk. The optical head is positioned by a position sensor which comprises an optical mask and an optical non-contact linear scale of an overlap grating.

However, in the optical disk apparatus of this type, precise positioning cannot be performed due to a mounting error of the optical scale, a change in temperature and humidity, and a manufacturing error. For these reasons, after optical head access is made to a track and the track number of this track is detected, the optical head is then accessed to a desired track. Therefore, the access time is increased, and control is complicated.

SUMMARY OF THE INVENTION

It is an object of the present invention to provide a data recording apparatus which accurately performs positioning of a recording/reproduction head, shortens access time of the head, and simplifies access control.

In order to achieve the above object of the present invention, there is provided a data recording apparatus, comprising:

(a) recording/reproduction head means for recording data on and reproducing the data from a recording medium on which a plurality of tracks are formed at a predetermined pitch;

(b) moving means, connected to said recording/reproduction head means, for moving said recording/reproduction head means on the recording medium;

(c) position detecting means having a scale at the predetermined pitch corresponding to positions on the recording medium;

(d) track pitch computing means for computing a track pitch;

(e) scale translating means, connected to said track pitch computing means, for translating a desired track number to a scale value of said position detecting means by using the track pitch which is computed by said track pitch computing means;

(f) driving means connected to said scale translating means, said position detecting means and said moving means, said driving means being adapted to drive said moving means until the scale value from said scale translating means coincides with the scale value detected by said position detecting means; and (g) correcting means connected to said recording/reproduction head means, said position detecting means, said track pitch computing means, said scale translating means, and said driving means, said correcting means being adapted to compute a track pitch by a track number of a track to which said recording/reproduction head means corresponds and by the scale value detected by said position detecting means when a difference between the scale value obtained by said scale translating means and the scale value detected by said position detecting means exceeds a predetermined number of tracks at the time of access, and being adapted to correct the track pitch which is used by said scale translating means, using the track pitch computed by said correcting means.

BRIEF DESCRIPTION OF THE DRAWINGS

Other objects and features of the present invention will be apparent from the following description taken in connection with the accompanying drawings, in which:

FIGS. 1A and 1B are block diagrams showing a data recording apparatus according to an embodiment of the present invention; and FIGS. 2A and 2B are flow charts for explaining the mode of operation of the data recording apparatus shown in FIGS. 1A and 1B.

DETAILED DESCRIPTION OF THE PREFERRED EMBODIMENT

Figure 1B:
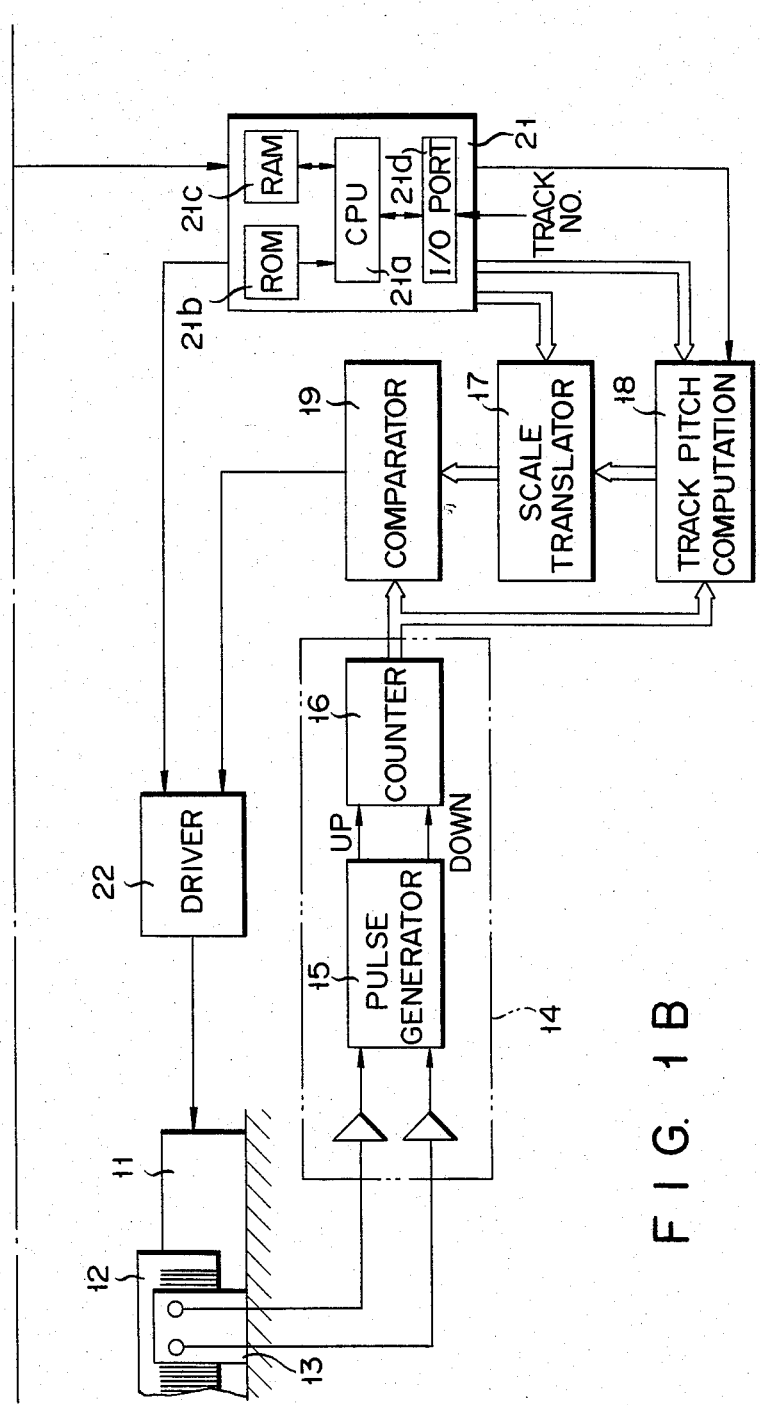

Referring to FIGS. 1A and 1B, pregrooved recording tracks are spirally formed in the surface of an optical disk (recording medium) 1. The optical disk 1 is rotated by a motor 2. An optical recording/reproduction or optical head 3 comprises a laser diode 4 for oscillating a laser beam, a collimator lens 5, a deflection beam splitter 6, a $\lambda/4$ plate 7, an objective lens 8, a focusing lens 9, and a photosensor such as a photodiode 10 for photoelectrically transducing the reflected light by the optical disk 1 to an electrical signal. The optical head 3 is driven by a linear motor (moving mechanism) 11. The laser diode 4 is controlled and driven by a laser driver 23 to be described later. The level of the output signal from the diode 4 can be switched so as to produce a reproducing beam and a recording beam which have different energy levels. The main beam radiated from the front side of the laser diode 4 is collimated by the collimator lens 5 and is guided to the objective lens 8 through the beam splitter 6 and the $\lambda/4$ plate 7. The laser beam from the objective lens 8 is focused to have a beam spot of about 1 μm in diameter and is incident on the lower surface of the optical disk 1. The laser beam reflected by the optical disk 1 is guided to the focusing lens 9 through the objective lens 8, the $\lambda/4$ plate 7 and the beam splitter 6. The beam is then focused on a light-receiving surface of the photodiode 10. The optical signal is then converted by the photodiode 10 to an electrical signal.

The optical head 3 is mounted on a movable portion of the DC linear motor (moving mechanism) 11 also having a stationary portion. The optical head 3 is moved in the radial direction of the optical disk 1 at a linear movement by the linear motor 11. An optical scale 12 is fixed on the movable portion of the linear motor 11. A detection section 13 detects the position of the optical scale 12. The detection section 13 produces two detection signals which have different phases upon movement of the optical head 3 in accordance with the overlap grating type detection method. A position signal processing circuit 14 processes the output signals from the detection section 13 in a predetermined manner, thereby producing a position signal. The position signal processing circuit 14 comprises: a pulse generator 15 for generating a position pulse in accordance with the two detection signals which have different phases; and a counter 16 for counting up or down in accordance with the pulse from the pulse generator 15. A scale translator (also designated as a scale translation section in FIGS. 2A and 2B) 17 translates track number data from a control section 21 (to be described later) into a scale value corresponding to a scale of the optical scale 12, using track pitch data from a track pitch computation section 18.

The scale translator 17 computes the scale value by an arithmetic operation "scale value track number × track pitch ÷ scale pitch (32 μm)". The track pitch computation section 18 prestores track pitch data which indicates a track pitch of 3 μm and computes the track pitch by operating on the track number data from the control section 21 and the scale value from the counter 16. The track pitch is then updated according to the relation, "track pitch = count × scale pitch (32 μm) ÷ track number". A comparator 19 compares the scale value from the scale transistor 17 with the scale value from the position signal detection circuit 14. A digitizer 20 converts the analog signal from the photodiode 10 into a binary signal. The control section 21 comprises a microcomputer which has a CPU 21a, a ROM 21b, a RAM 21c and an I/O port 21d. An 8-bit microcomputer 8085 manufactured by Toshiba Corporation can be used as the control section 21. The control section 21 receives track number data from a CPU (not shown) of a main unit (not shown) and transmits it to the scale translator 17 and the track pitch computation section 18. The control section 21 produces a track jump pulse in accordance with a difference between the track number data from the digitizer 20 and the target track number data when the difference falls within a range of "10". The control section 21 also produces a correction signal to the track pitch computation section 18 when the abovementioned difference is more than "100". A driver 22 drives the linear motor 11 in accordance with an output signal from the comparator 19 or the track jump pulse from the control section 21, thereby linearly driving the optical head 3 in the radial direction (indicated by arrows A and B) of the optical disk. The laser driver 23 controls and drives the laser diode 4 in accordance with the recording data supplied thereto.

Figure 2B:
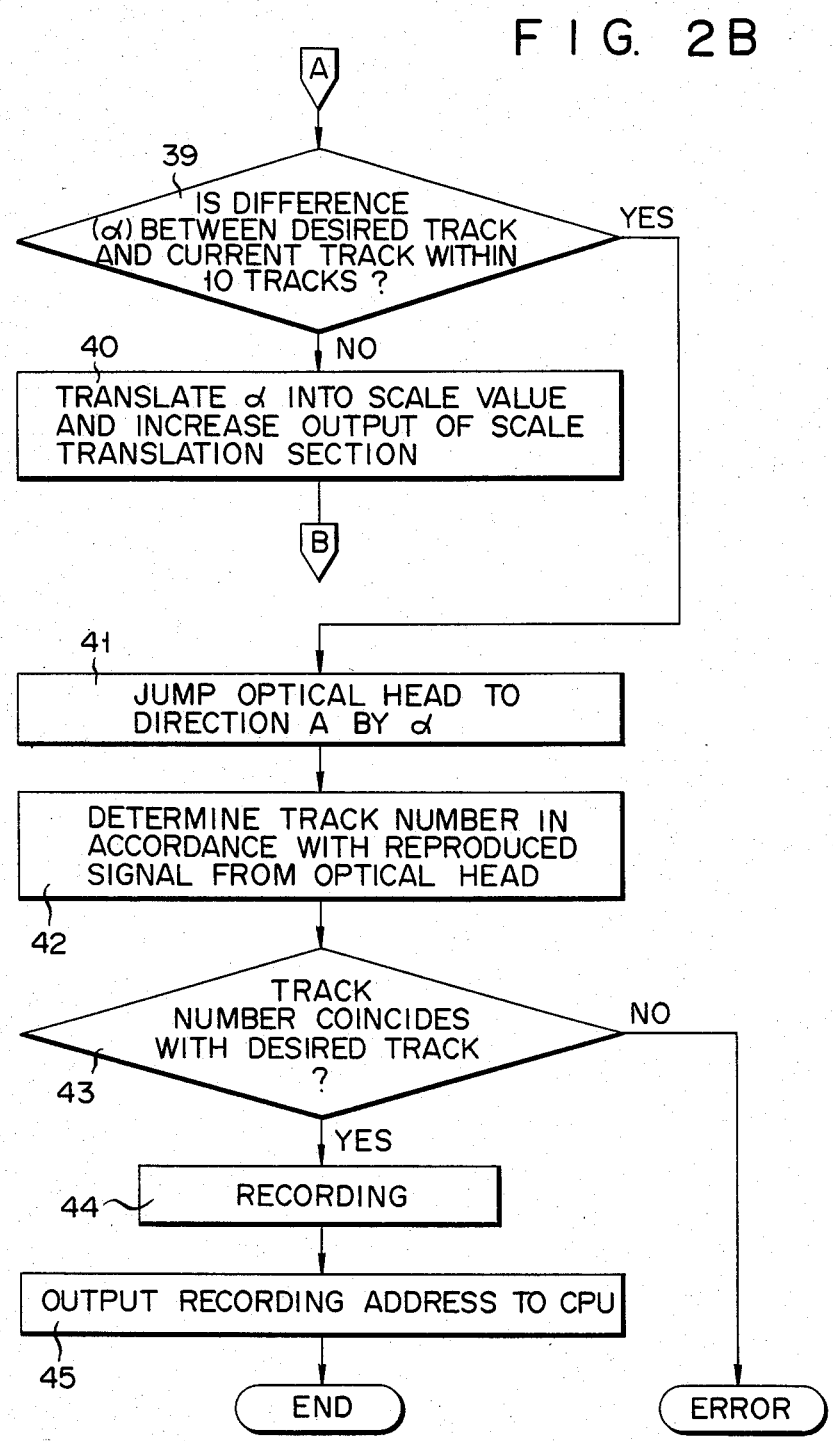

The mode of operation of the data recording apparatus according to the present invention will be described with reference to the flow charts shown in FIGS. 2A and 2B.

In step 31, the track number data to be accessed by address data is supplied from a CPU (not shown) to the control section 21. The control section 21 then supplies the track number data to the scale translation section 17. In step 32, the optical disk 1 is rotated, and the program advances to step 33. In step 33, the scale translation section 17 translates the track number data from the control section 21 into a corresponding scale value using the track pitch data from the track computation section 18. In other words, the scale translation section 17 performs the operation "scale value = track number × track pitch ÷ scale pitch (32 μm)". In step 34, the optical head 3 is moved in the direction A, and the program advances to step 35. In step 35, the scale value from the scale translation section 17 is compared by the comparator 19 with the count of the counter 16. The comparator 19 allows the driver 22 to operate until the scale value from the scale translation section 17 coincides with the count of the counter 16. In step 36, the optical head is stopped, and the track number is determined in accordance with the reproduced signal. It is then checked in step 37 whether or not a difference between a desired or target track and the current track is more than 100 tracks. If YES in step 37, the control section 21 produces the correction signal to the track pitch computation section 18 in step 38. As a result, the track pitch computation section 18 computes a track pitch in accordance with the current track number and the scale number of the counter 16. More particularly, the track pitch is obtained by the arithmetic operation "track pitch = count × scale pitch (32 μm) ÷ track number. The program advances to step 39. However, if NO in step 37, the program directly advances to step 39. In step 39, the control section 21 determines the current track number in accordance with the reproduced signal and checks whether or not a difference between the desired track and the current track is within 10 tracks. If NO in step 39, the scale value is converted into an updated scale value in accordance with the difference, in step 40. The scale data corresponding to this difference is then supplied to the scale translation section 17. The program then returns to step 34 again. Steps 34 and 35 are then executed, and the driver 22 and hence the linear motor 11 are driven until the comparator 19 detects coincidence of the scale value of the scale translation section 17 and the count of the counter 16.

However, if YES in step 39, a track jump pulse is supplied to the driver 22. This track jump pulse indicates the difference between the desired track number and the current track number. As a result, in step 41, the driver 22 drives the optical head 3 by the number of tracks corresponding to the difference one at a time in the radial direction of the optical disk (the direction indicated by arrow A). In step 42, the control section 21 determines the track number in accordance with the reproduced signal from the optical head 3. It is checked in step 43 whether or not the optical head 3 corresponds to the desired track. If YES in step 43, the control section 21 supplies a control signal to a modulator 32. In step 44, the modulator 32 demodulates data signals from the beginning in units of bits and produces track number data. The laser driver 37 then changes the reproducing beam to the recording beam in accordance with the modulated signal supplied thereto. Data pits are then formed in the pregrooves. Finally, in step 45, the recording address data is fetched to the CPU to complete the sequence.

As described above, scale translation is performed using the corrected track pitch data when image data is recorded on or reproduced from the optical disk 1 using the optical head 3. Therefore, the optical head 3 can be moved near the desired or target track by one access operation.

In the above embodiment, the track pitch correction is performed when the count of the counter 16 coincides with the scale value of the scale translation section 17 and when the difference between the desired track and the track currently corresponding to the optical head is more than 100 tracks. However, the number of tracks which corresponds to the difference is not limited to 100 tracks.

Many changes and modifications in the above embodiment can, of course, be carried out without departing from the scope of the invention. That scope, therefore, is intended to be limited only by the scope of the appended claims.

What is claimed is:

1. A data recording apparatus comprising:
   (a) a recording/reproducing head for recording data on a recording medium having a plurality of tracks and for reproducing the data from the recording medium;
   (b) a position detecting means having a predetermined scale pitch for detecting the position of the head and for outputting a scale value representing the position of the head with respect to the plurality of tracks of the recording medium;
   (c) a track pitch computing means for computing the pitch at which the tracks are arranged, by multiplying the scale value and the predetermined scale pitch and then by dividing the product of the multiplication by the number of said plurality of tracks;
   (d) a scale value computing means for computing a new scale value by multiplying the number of said plurality of tracks by the track pitch computed by the track pitch computing means and then by dividing the product of the multiplication by the predetermined scale pitch;
   (e) a head driving means for driving the recording/reproducing head until the scale value obtained by the position detecting means becomes equal to the scale value obtained by the scale value computing means; and
   (f) a control means for controlling the position detecting means, track pitch computing means, scale value computing means and head driving means in such a manner that when the difference between the number of a track to which the head has been moved by the head driving means and the number of any desired track to which the head is to have an access surpasses a predetermined value, the track pitch computing means computes a track pitch from the track number to which the head has been moved and supplies the track pitch to the scale value computing means, so that the scale value computing means computes a scale value thereby to move the head to the desired track.

2. A method for accessing a data recording apparatus for recording data on a recording medium having a plurality of tracks and for reproducing the data from the recording medium, comprising the steps of:
   (a) computing a track pitch from the number of any desired track in accordance with the following equation:

$$\text{track pitch} = (\text{scale value} \times \text{scale pitch}) \div \text{track number};$$

(b) computing a scale value from the track pitch obtained in step (a), in accordance with the following equation:

$$\text{scale value} = (\text{track number} \times \text{track pitch}) \div \text{scale pitch};$$

(c) moving a recording/reproducing head in accordance with the scale value obtained in step (b);
   (d) reading the number of the track to which the recording/reproducing head has been moved; and
   (e) repeating steps (a) and (c) when the difference between the track number read in step (d) and the number of the desired track surpasses a predetermined value.

* * * * *